US012009512B2

(12) United States Patent
Tamura et al.

(10) Patent No.: US 12,009,512 B2
(45) Date of Patent: *Jun. 11, 2024

(54) NONAQUEOUS ELECTROLYTE SECONDARY BATTERY

(71) Applicant: Panasonic Intellectual Property Management Co., Ltd., Osaka (JP)

(72) Inventors: Takamasa Tamura, Osaka (JP); Nobuhiro Sakitani, Tokushima (JP); Takaharu Morikawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 802 days.

This patent is subject to a terminal disclaimer.

(21) Appl. No.: 17/054,881

(22) PCT Filed: Apr. 26, 2019

(86) PCT No.: PCT/JP2019/017893
§ 371 (c)(1),
(2) Date: Nov. 12, 2020

(87) PCT Pub. No.: WO2019/230298
PCT Pub. Date: Dec. 5, 2019

(65) Prior Publication Data
US 2021/0218019 A1  Jul. 15, 2021

(30) Foreign Application Priority Data

May 30, 2018 (JP) ................................. 2018-103824

(51) Int. Cl.
*H01M 4/38* (2006.01)
*H01M 4/36* (2006.01)
(Continued)

(52) U.S. Cl.
CPC ........... *H01M 4/386* (2013.01); *H01M 4/364* (2013.01); *H01M 4/583* (2013.01); *H01M 4/587* (2013.01);
(Continued)

(58) Field of Classification Search
CPC ........ H01M 4/386; H01M 4/38; H01M 4/587; H01M 4/58; H01M 10/0525; H01M 10/0587
See application file for complete search history.

(56) References Cited

U.S. PATENT DOCUMENTS

2005/0123829 A1   6/2005  Fukui et al.
2007/0111100 A1*  5/2007  Bito ..................... C22C 19/007
                                                              429/231.95
(Continued)

FOREIGN PATENT DOCUMENTS

CN    1624967 A    6/2005
CN    107925125 A  4/2018
(Continued)

OTHER PUBLICATIONS

International Search Report dated Jul. 30, 2019, issued in counterpart application No. PCT/JP2019/017893 (2 pages).
(Continued)

*Primary Examiner* — Kenneth J Douyette
(74) *Attorney, Agent, or Firm* — WHDA, LLP (57) ABSTRACT

A nonaqueous electrolyte secondary battery according to an embodiment includes a negative electrode including a negative electrode current collector, a first negative electrode mixture layer disposed on a first surface of the negative electrode current collector, and a second negative electrode mixture layer disposed on a second surface of the negative electrode current collector. The first surface and the second surface face outward and inward of the electrode body,
(Continued)

respectively. The first negative electrode mixture layer includes a Si active material. The content of the Si active material in teens of Si is lower in a portion of the first negative electrode mixture layer which faces the negative electrode current collector in a thickness direction of the first negative electrode mixture layer, than in a portion of the first negative electrode mixture layer which faces the surface of the first negative electrode mixture layer in the thickness direction.

6 Claims, 2 Drawing Sheets

(51) Int. Cl.
*H01M 4/58* (2010.01)
*H01M 4/583* (2010.01)
*H01M 4/587* (2010.01)
*H01M 4/64* (2006.01)
*H01M 10/0525* (2010.01)
*H01M 10/0587* (2010.01)
*H01M 4/02* (2006.01)

(52) U.S. Cl.
CPC ......... *H01M 4/64* (2013.01); *H01M 10/0525* (2013.01); *H01M 10/0587* (2013.01); *H01M 2004/021* (2013.01); *H01M 2004/027* (2013.01)

(56) References Cited

U.S. PATENT DOCUMENTS

| 2018/0131009 A1 | 5/2018 | Suehiro et al. |
| 2018/0248220 A1 | 8/2018 | Manabe et al. |
| 2019/0123310 A1 | 4/2019 | Shibutani |

FOREIGN PATENT DOCUMENTS

| JP | 2005-197080 A | 7/2005 |
| JP | 2005-209496 A | 8/2005 |
| JP | 2010-212228 A | 9/2010 |
| JP | 2013-041742 A | 2/2013 |
| JP | 2013-178913 A | 9/2013 |
| JP | 2014-035885 A | 2/2014 |
| JP | 2014-096201 A | 5/2014 |
| JP | 2018-010764 A | 1/2018 |
| WO | 2017/010046 A1 | 1/2017 |
| WO | 2017/038041 A1 | 3/2017 |

OTHER PUBLICATIONS

Extended (Supplementary) European Search Report dated Jul. 6, 2021, issued in counterpart EP application No. 19811323.5. (81 pages).

Office Action dated Dec. 19, 2023, issued in counterpart CN application No. 201980035918.0, with English translation. (11 pages).

\* cited by examiner

NONAQUEOUS ELECTROLYTE SECONDARY BATTERY

TECHNICAL FIELD

The present disclosure relates to nonaqueous electrolyte secondary battery and specifically to a nonaqueous electrolyte secondary battery that includes a spirally wound electrode body.

Background Art

It is known that Si and si-containing materials are capable of occluding a larger amount of lithium ions per unit volume than carbon materials, such as graphite. Therefore, using a Si-containing material or the like as a negative electrode active material increases the battery capacity. For example, PTL 1 discloses a nonaqueous electrolyte secondary battery produced using graphite and a Si-containing material as negative electrode active materials. PTL 1 also discloses a structure in which the mass ratio of the graphite to the Si-containing material in a negative electrode mixture layer (Mass of graphite/Mass of Si-containing material) increases continuously or discontinuously with the distance from the surface of the negative electrode current collector.
Citation List
Patent literature.
PTL 1; Japanese Published Unexamined Patent Application No. 2013-178913
Summary of Invention
Technical Problem.

Since the volumes of Si and Si-containing materials change significantly during charging and discharging, the cycle characteristics of a nonaqueous electrolyte secondary battery produced using a Si active material composed of at least one of Si and a Si-containing material as a negative electrode active material is likely to become degraded. In particular, in the case where the nonaqueous electrolyte secondary battery includes a spirally wound electrode body, the change in the volume of the Si active material greatly affects a portion of the negative electrode which has a small radius of curvature, such as a winding start-side edge of the negative electrode from which the electrode body edge wound. An object of the present disclosure is to enhance the cycle characteristics of a nonaqueous electrolyte secondary battery including a spirally wound electrode body produced using a Si active material as a negative electrode active material
Solution to Problem A nonaqueous electrolyte secondary battery according to the present disclosure is a non aqueous electrolyte secondary battery including a spirally wound electrode body in which a positive electrode and a negative electrode are spirally wound with a separator interposed therebetween. The negative electrode includes a negative electrode current collector, a first negative electrode mixture layer disposed on a first surface of the negative electrode current collector, and a second negative electrode mixture layer disposed on a second surface of the negative electrode current collector. The first surface and the second surface, face outward and inward of the electrode body, respectively. The first negative electrode mixture layer includes a Si active material composed of at least one of Si and a Si-containing material. A content of the Si active material in terms of Si is lower in a portion of the first negative electrode mixture layer which faces the negative electrode current collector in a thickness direction of the first negative electrode mixture layer, than in a portion of the first negative electrode mixture layer which faces a surface of the first negative electrode mixture layer in the thickness direction. In another case, the second negative electrode mixture layer includes a Si active material composed of at least one of Si and a Si-containing material. A content of the Si active material in terms of Si is lower in a portion of the second negative electrode mixture layer which faces a surface of the second negative electrode mixture layer in a thickness direction of the second negative electrode mixture layer, than in a portion of the second negative electrode mixture layer which faces the negative electrode current collector in the thickness direction.
Advantageous Effects of Invention according to an aspect of the present disclosure, the cycle characteristics of a nonaqueous electrolyte secondary battery including a spirally wound electrode body produced using a Si active material as a negative electrode active material may be enhanced.

DESCRIPTION OF EMBODIMENTS

As described above, the cycle characteristics of a nonaqueous electrolyte secondary battery including a spirally wound electrode body produced using a Si active material as a negative electrode active material is likely to become degraded. The degradation of cycle characteristics is caused due to a significant change in the volume of the Si active material which occurs during charging and discharging. Specifically, it is considered that the degradation of cycle characteristics be caused primarily because the significant change in the volume of the Si active material results in the degradation or loss of the contact between active material particles and consequently increases the amount of active material particles isolated from the electrical conduction paths present in the negative electrode mixture layer. In the case where a spirally wound electrode body is used, the change in the volume of the Si active material greatly affects a portion of the negative electrode which has a small radius of curvature, such as a winding start-side edge of the negative electrode from which the electrode body is wound.

The inventors of the present invention conducted extensive studies in order to achieve the above object and consequently found that improving the content of the Si active material in terms of Si in at least one or the first and second negative electrode mixture layers may markedly enhance the cycle characteristics of the battery. In the nonaqueous electrolyte secondary battery according to the present disclosure, the degradation of cycle characteristics may be limited while a Si active material is added to a negative electrode mixture layer with efficiency in order to increase battery capacity.

An embodiment of the present disclosure is described in detail below. Although the battery described below as an example is a cylindrical battery that includes a spirally wound electrode body 14 and a cylindrical battery casing 15 housing the spirally wound electrode body 14, the shape of the battery casing is not limited to cylindrical and may be, for example, rectangular. A battery casing composed of a laminated sheet including a metal layer and a resin layer may also be used. The electrode body may be any electrode body having a spirally wound structure. Although the electrode body may be formed in a flat shape, the structure of the negative electrode according to the present disclosure may be particularly effective when the electrode body has a cylindrical, spirally wound structure.

Figure 1:
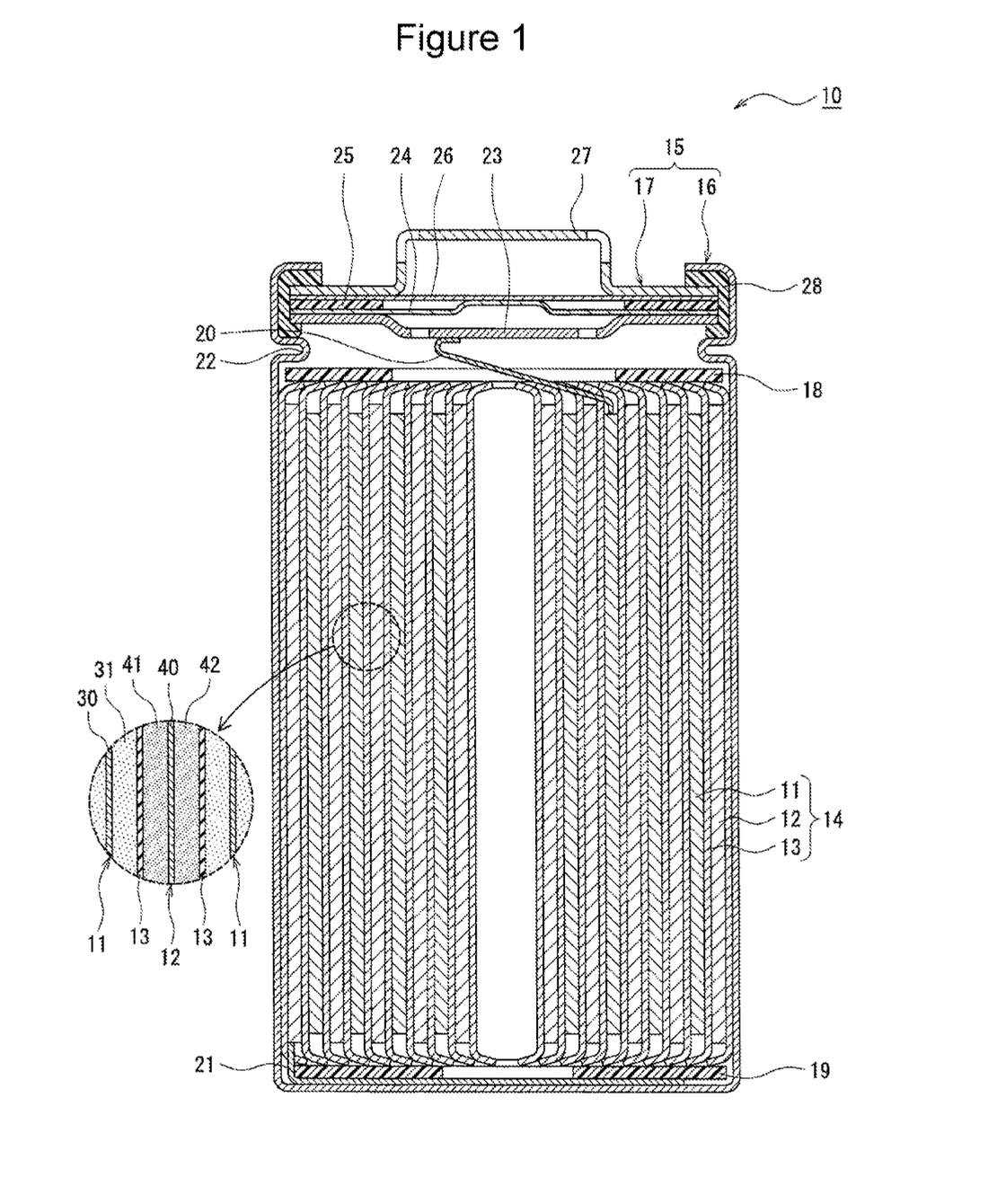
FIG. 1 is a cross-sectional view of a nonaqueous electrolyte secondary battery according to an embodiment.

FIG. 1 is a cross-sectional view of a nonaqueous electrolyte secondary battery 10 according to an embodiment.

As illustrated in FIG. 1 as an example, the nonaqueous electrolyte secondary battery 10 includes a spirally wound electrode body 14, a nonaqueous electrolyte (not illustrated in the drawing), and a battery casing 15 that houses the electrode body 14 and the nonaqueous electrolyte. The electrode body 14 has a spirally wound structure in which a positive electrode 11 and a negative electrode 12 are spirally wound with a separator 13 interposed therebetween The battery casing 15 includes a closed-end, tubular packaging can 16 and a sealing material 17 with which the opening of the packaging can 16 is sealed. The nonaqueous electrolyte secondary battery 10 further includes a resin gasket 28 interposed between the packaging can 16 and the sealing material 17.

The nonaqueous electrolyte includes a nonaqueous solvent and an electrolyte salt dissolved in the nonaqueous solvent. Examples of the nonaqueous solvent include an ester, an ether, a nitrile, an amide, and mixed solvents of two or more of the above solvents. The nonaqueous solvent may include a halogen-substituted compound produced by replacing at least a part of the hydrogen atoms 32 included in any of the above solvents with halogen atoms, such as fluorine atoms. The nonaqueous electrolyte is not limited to a liquid electrolyte and may be a solid electrolyte including a gelatinous polymer or the like. Examples of the electrolyte salt include lithium salts, such as $LiPF_6$.

The electrode body 14 is constituted by a long-length positive electrode 11, a long-length negative electrode 12, two long-length separators 13, a positive electrode, tab 20 joined to the positive electrode 11, and a negative electrode tab 21 joined to the negative electrode 12. The negative electrode 12 is formed to be a size larger than the positive electrode 11 in order to prevent the precipitation formed so as to be longer than the positive electrode 11 in the longitudinal direction and the width direction (transverse direction). The two separators 13 are formed to be a size larger than at least the positive electrode 11 and arranged such that, for example, the positive electrode 11 is interposed therebetween.

Insulating plates 18 and 19 are disposed above and below the electrode body 14, respectively. In the example illustrated in FIG. 1, the positive electrode tab 20 attached to the positive electrode 11 extends toward the sealing material 17 through a through-hole formed in the insulating plate 18, and the negative electrode tab 21 attached to the negative electrode 12 extends toward the bottom of the packaging can 15 throng the outside of the insulating plate 19. The positive electrode tab 20 is connected to the lower surface of a bottom plate 23 of the sealing material 17 by welding or the like. A cap 27, which is the top plate of the sealing material 17 electrically connected to the bottom plate 23, serves as a positive terminal. The negative electrode tab 21 is connected to the inner surface of the bottom of the packaging can 16 serves as a negative terminal.

The packaging can 16 is, for example, a closed-end, cylindrical metal container. As described above, the gasket 28 is interposed between the packaging can 16 and the sealing material 17 to hermetically seal the internal space of the battery casing 15. The packaging can 16 has a grooved portion 22 that supports the sealing material 17 and is formed by, for example, pressing the side surface from the outside of the packaging can 16. The grooved portion 22 is preferably formed in a ring-like shape in the circumferential direction of the packaging can 16. The sealing material 17 is supported by the upper surface of the grooved portion 22. The upper end of the packaging can 16 is bent inward and caulked to the periphery of the sealing material 17.

The sealing material 17 has a structure including the bottom plate 23, a lower valve plate 24, an insulating member 25, an upper valve plate 26, and a cap 27 which are stacked on top of one another in this order from closest to the electrode body 14. The members constituting the sealing material 17 have, for example, a disk-like shape or a ring-like shape. The above members are electrically connected to one another except the insulating member 25. The lower valve plate 24 and the upper valve plate 26 are connected to each other at the centers thereof. The insulating member 25 is interposed between the periphery of the lower valve plate 24 and the periphery of the upper valve plate 26. In the case where the internal pressure of the battery is increased due to anomalous heat generation, rupturing occurs as a result of the lower valve plate 24 becoming deformed to press the upper valve plate 26 upward toward the cap 27 and, consequently, the current pathway between the lower valve plate 24 and the , upper valve plate 26 becomes interrupted. If the internal pressure is further increased, the upper valve plate 26 becomes ruptured and the gas is exhausted through the opening of the cap 27.

Positive Electrode

The positive electrode 11 includes a positive electrode current collector 30 and positive electrode mixture layers 31 disposed on the respective surfaces of the positive electrode current collector 30. The positive electrode current collector 30 may be a foil made of a metal stable in the potential range of the positive electrode 11, such as aluminum or an aluminum alloy, a film including a surface layer made of the above metal, or the like. The positive electrode mixture layer 31 includes a positive electrode active material, a conductive agent, and a binder. The positive electrode 11 may be produced by, for example, applying a positive electrode mixture slurry containing a positive electrode active material, a conductive agent, a binder, and the like to the positive electrode current collector 30, drying the resulting coating films, and then compressing the coating films to form the positive electrode mixture layers 31 on the respective surfaces of the positive electrode current co lector 30.

The positive electrode active material includes a lithium metal composite oxide as a principal constituent. Examples of the metal element included in the lithium metal composite oxide include Ni, Co, Mn, Al, B, Mg, Ti, V, Cr, Fe, Cu, Zn, Ga, Sr, Zr, Nb, In, Sn, Ta, and W. Examples of suitable lithium metal composite oxides include a composite oxide containing at least one element selected from Ni, Co, Mn, and Al. The lithium metal composite oxide may be provided with, for example particles of an inorganic compound, such as aluminum oxide or a lanthanide-containing compound, adhered on the surfaces of particles thereof.

Examples of the conductive agent included in the positive electrode mixture layer 31 include carbon materials, such as carbon black, acetylene black, Ketjenblack, and graphite. Examples of the binder included in the positive electrode mixture layer 31 include fluororesins, such as popytetrafluoroethylene (PTFE) and polyvinylidene fluoride (PVdF), polyacrylonitrile (PAN) , a polyimide, an acrylic resin, and a polyolefin. The above resins may be used in combination with a cellulose derivative, such as carboxymethyl cellulose (CMC) or a salt thereof, polyethylene oxide (PEO), or the like.

Negative Electrode

Figure 2:
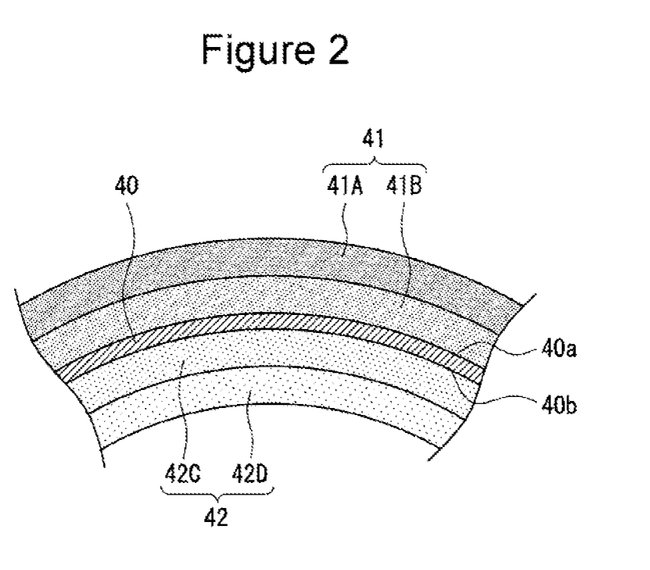
FIG. 2 is a cross-sectional view of a negative electrode according to an embodiment.

FIG. 2 is a cross-sectional view of the negative electrode 12. As illustrated in FIGS. 1 and 2 as an example, the negative electrode 12 includes a negative electrode current collector 40, a negative electrode mixture layer 41 (first negative electrode mixture layer) disposed on a first surface 40a of the negative electrode current collector 40 which faces outward of the electrode body 14, and a negative electrode mixture layer 42 (second negative electrode mixture layer) disposed on a second surface 40b of the negative electrode current collector 40 which faces inward of the electrode body 14. While the positive electrode 11 has a layer structure including the positive electrode current collector 30 and the positive electrode mixture layers 31 that are disposed on the respective surfaces of the positive electrode current collector 30 and composed of a mixture having a uniform composition, in the negative electrode 12, the content of a Si active material composed of at least one of Si and a Si-containing material in at least one of the negative electrode mixture layers 41 and 42 changes in a continuous or stepwise manner. In at least one of the negative electrode mixture layers 41 and 42, the content of the Si active material varies between the surface-side portion of the mixture layer and the negative electrode current collector 40-side portion of the mixture layer. The details are described below.

The negative electrode current collector 40 may be a foil made of a metal stable in the potential range of the negative electrode 12, such as copper or a copper alloy, a film including a surface layer made of the above metal, or the like. The negative electrode mixture layer 41 includes a negative electrode active material and a binder. The negative electrode 12 may be produced by, for example applying a negative electrode mixture slurry containing a negative electrode active material, a binder, and the like to the negative electrode current collector 40, drying the resulting coating films, and then compressing the coating films to form the negative electrode mixture layer 41 on the first surface 40a of the negative electrode current collector 40. In the production of the negative electrode 12, for example, four types of negative electrode mixture slurries containing the Si active material at different proportions may be used. The details are described below.

As illustrated in FIG. 2 as an example, the negative electrode 12 constituting the apirally wound electrode body 14 is arranged to curve along the length thereof in the longitudinal direction. The negative electrode 12 is produced in the form of a flat sheet and becomes curved when it is spirally wound together with the positive electrode 11 and the separator 13 in the production of the electrode body 14. The negative electrode 12 commonly has a radius of curvature of about 1 to 10 mm. The radius of curvature of the negative electrode 12 varies between a winding start-side of the electrode body 14 from which the electrode body 14 is wound and a winding end-side of the electrode body 14 to which the electrode body 14 is wound; the radius of curvature of the negative electrode 12 satisfies Winding start-side edge<Winding end-side edge. The minimum radius of curvature of the negative electrode 12 is, for example, 1 to 5 mm, or 1 to 2 mm.

Since the negative electrode 12 is produced in the form of a flat sheet, when the negative electrode 12 is curved, the convex-side portion of the negative electrode 12 is elongated and the concave-side portion of the negative electrode 12 is compressed. Specifically, the negative electrode mixture layer 41 disposed on the first surface 40a of the negative electrode current collector 40 which faces outward of the electrode body 14 is elongated, while the negative electrode mixture layer 42 disposed on the second surface 40b of the negative electrode current collector 40 which faces inward of the electrode body 14 is compressed. The surface-side portion of the negative electrode mixture layer 41 in the thickness direction of the mixture layer is elongated, while the negative electrode current collector 40-side portion of the mixture layer is compressed. The negative electrode current collector 40-side portion of the negative electrode mixture layer 42 in the thickness direction of the mixture layer is elongated, while the surface-side portion of the mixture layer is compressed. The inventors of the present invention successfully enhanced the cycle characteristics of the battery by improving the layer structure of the negative electrode 12 focusing on the above point.

Although one of the negative electrode mixture layers 41 and 42 does not necessarily include the Si active material it is preferable that both of the negative electrode mixture layers 41 and 42 include the Si active material in order to, for example, increase the battery capacity. In such a case, the average content of the Si active material in terms of Si in the negative electrode mixture layer 42 is preferably lower than the average content of the Si active material in terms of Si in the negative electrode mixture layer 41. Since the negative electrode mixture layer 42 is compressed as described above, the negative electrode mixture layer 42 has a smaller margin that allows a great change in the volume of the Si active material than the negative electrode mixture layer 41. Accordingly, in order to enhance cycle characteristics, it is preferable to satisfy Content of the Si active material in terms of Si in the negative electrode mixture layer 41>Content of the Si active material in terms of Si in the negative electrode mixture layer 42. The content of the Si active material in terms of Si is calculated as the ratio of the mass of the Si active material included in the negative electrode mixture layer 41 or 42 in terms of Si to the mass of the negative electrode active material included in the negative electrode mixture layer. The mass of the Si active material in terms of Si is calculated by multiplying the mass of the Si active material by the mass ratio of Si to the Si active material. Examples of the method for comparing the content of the Si active material in terms of Si in the surface-side portion of the negative electrode mixture layer 41 or 42 with that in the current collector-side portion of the mixture layer include a method in which the negative electrode mixture layer 41 or 42 is divided into parts at regular intervals in the thickness direction and the contents of the Si active material in terms of Si in the respective parts are calculated and compared with one another. In the case where the negative electrode mixture layers 41 and 42 have a multilayer structure, the contents of the Si active material in terms of Si in the respective layers may be calculated to compare the content of the Si active material in terms of Si in the surface-side portion of the negative electrode mixture layer 41 or 42 with that in the current collector-side portion of the mixture layer.

In other words, the content of the Si active material in terms of Si in the negative electrode mixture layer 41 is set to be higher than the content of the Si active material in terms of Si in the negative electrode mixture layer 42. Since the negative electrode mixture layer 41 is elongated as described above, the negative electrode mixture layer 41 has a larger margin that allows a great change in the volume of the Si active material than the negative electrode mixture layer 42. Therefore, increasing the content of the Si active material in the negative electrode mixture layer 41 is not likely to degrade cycle characteristics.

The content of the Si active material in terms of Si in the negative electrode current collector 40-side portion of the negative electrode mixture layer 41 in the thickness direction of the mixture layer is lower than in the surface-side portion of the mixture layer. The content of the Si active material in terms of Si in the surface-side portion of the negative electrode mixture layer 42 in the thickness direction of the mixture layer is lower than in the negative electrode current collector 40-side portion of the mixture layer. For example, when the negative electrode mixture layer 41 is divided into two halves at the center in the thickness direction, the content of the Si active material in terms of Si in a portion of the mixture layer which is located on the negative electrode current collector 40-side is lower than in a portion of the mixture layer which is away from the negative electrode current collector 40 and located on the surface-side of the mixture layer. When the negative electrode mixture layer 42 is divided into two halves at the center in the thickness direction, the content of the Si active material in terms of Si in a portion of the mixture layer which is located on the surface-side of the mixture layer is lower than in a portion of the mixture layer which id located on the negative electrode current collector 40-side.

In this embodiment, the negative electrode mixture layers 41 and 42 have a multilayer structure. The negative electrode mixture layer 41 includes a first layer 41A arranged to face the surface of the mixture layer and a second layer 41B arranged closer to the negative electrode current collector 40 than the first layer 41A, the second layer 41B containing the Si active material at a lower proportion in terms of Si than the first layer 41A. The negative electrode mixture layer 42 includes a third layer 42C arranged to face the negative electrode current collector 40 and a fourth layer 42D arranged closer to the surface of the mixture layer than the third layer 42C, the fourth layer 42D containing the Si active material at a lower proportion in terms of Si than the third layer 42C.

It is preferable that the content of the Si active material in terms of Si decrease is the direction from the outer periphery of the negative electrode 12 to the inner periphery of the negative electrode that is, in the direction from the first layer 41A of the negative electrode mixture layer 41 to the fourth layer 42D of the negative electrode mixture layer 42. In other words, the content of the Si active material in terms of Si is at maximum in the first layer 41A and at minimum in the fourth layer 42D. The content of the Si active material in terms of Si in the second layer 41B may be equal to that in the third layer 42C. The second layer 41B and the third layer 42C may have the same layer structure. Although the content of the Si active material in terms of Si may satisfy Second layer 41B<Third layer 42C such that the average content of the Si active material in terms of Si satisfies Negative electrode mixture layer 41>Negative electrode mixture layer 42, it is preferable that the content of the Si active material in terms of Si in the second layer 41B be lower than that in the third layer 42C.

That is, it is preferable that the contents of the Si active material in terms of Si in the layers constituting the negative electrode mixture layers 41 and 42 satisfy First layer 41A>Second layer 41B≥Third layer 42C>Fourth layer 42D. Adjusting the contents of the Si active material in terms of Si in the negative electrode mixture layers 41 and 42 to satisfy the above relationship enables the degradation of cycle characteristics to be limited while the Si active material is used with efficiency to increase batter capacity. Although each of the negative electrode mixture layers 41 and 42 is constituted by two layers containing the Si active material at different proportions in terms of Si, the negative electrode mixture layers 41 and 42 may be constituted by three or more layers.

The layers constituting the negative electrode mixture layers 41 and 42 preferably further include a carbon active material. That is, it is preferable to use the Si active material in combination with a carbon active material as negative electrode active material. From the viewpoint of cycle characteristics, it is preferable that the content of the Si active material in each of the negative electrode mixture layers 41 and. 42 be lower than the content of the carbon active material in the negative electrode mixture layer. Examples of suitable carbon active materials include natural graphite, such as flake graphite, lump graphite, or amorphous graphite; and artificial graphite, such as massive artificial graphite (MAG) or graphitized mesophase carbon microbeads (MCMB).

The Si active material is composed of at least one of Si and a Si-containing material and is preferably composed of a Si-containing material, which shows a smaller volume change than Si during charging and discharging. Examples of the Si-containing material include a material represent by $SiO_x$ ($0.5 \leq x \leq 1.6$). $SiO_x$ has a structure constituted by, for, example, a $SiO_2$ matrix and Si microparticles dispersed therein. Alternatively, the Si-containing material may be a material (LSi) constituted by a lithium silicate ($Li_{2y}SiO_{(2+y)}$ ($0<y<2$)) phase and Si microparticles dispersed therein. The negative electrode mixture layers 41 and 42 may include $SiO_x$ and LSi.

It is preferable that a conductive coating composed of a material having a higher electrical conductivity than the Si-containing material be formed on the surfaces of particles of the Si-containing material. Examples of the material constituting the conductive coating include at least one selected from a carbon material, a metal, and a metal compound. In particular, a carbon material, such as amorphous carbon, is preferable. A carbon coating may be formed for example, a CVD method in which acetylene, methane, or the like is used; or by a method in which particles of the Si-containing material are mixed with coal pitch, petroleum pitch, a phenolic resin, or the like and subsequently a heat treatment is performed. Alternatively, the conductive coating may be formed by attaching a conductive filler, such as carbon black, onto the surfaces of particles of the Si-containing material using a binder. The amount of the conductive coating is, for example, 0.5% to 10% mass of the mass of particles of the Si-containing material.

The average contents of the Si active material in terms of Si in the negative electrode mixture layers 41 and 42 satisfy Negative electrode mixture layer 41>Negative electrode mixture layer 42 as described above. The difference in the content of the Si active material in terms of Si between the negative electrode mixture layers at 41 and 42 is preferably 1.5% or more, is more preferably 2% or more, and is further preferably 2.5% or more. The difference in the content of the Si active material between the first layer 42C and the second layer 42D are and the difference in the content at the Si active material between the third layer 42C and the fourth layer 42D are preferably 1% or more, are more preferably 1.5% or more, and are further preferably 2% or more. In such a case, cycle characteristics may be further markedly improved. The content of the Si active material in terms of Si may be measured by ICP (inductively coupled plasma).

In the case where the Si active material is used in combination with the carbon active material as negative electrode active materials, the content of the Si active material (Si-containing material) on a mass basis also satisfies Negative electrode mixture layer 41≥Third layer 42>Fourth layer 42D. The average content of the Si active material in the negative electrode mixture layer 41 is preferably 5% to 25% by mass and is more preferably 10% to 15% by mass. The average content of the Si active material in the negative electrode mixture layer 42 is lower than that in the negative electrode mixture layer 41, is preferably less than 15% by mass, and is more preferably 5% to 10% by mass. The types of the Si active materials added to the layers may be different from one another.

The proportion of the Si active material to the negative electrode active material in the negative electrode mixture layer 41 is preferably 5% to 25% by mass and is more preferably 10% to 15% by mass. The proportion of the Si active material to the negative electrode active material in the negative electrode mixture layer 42 is preferably less than 15% by mass and is more preferably 5% to 10% by mass. In other words, the proportion of the carbon active material to the negative electrode active material in the negative electrode mixture layer 41 is preferably 75% to 95% by mass. The proportion of the carbon active material to the negative electrode active material in the negative electrode mixture layer 42 is preferably 85% by mass or more.

Examples of the binder included in the negative electrode mixture layers 41 and 42 include a fluororesin, PAN, polyimide, an acrylic resin and a polyolefin, as in the case or the positive electrode 11. The binder included in the negative electrode mixture layers 41 and 42 is preferably a styrene-butadiene rubber (SBR) or a modified styrene-butadiene rubber. The negative electrode mixture layers 41 and 42 may further include, in addition to an SBR and the like, CMC or a salt thereof, polyacrylic acid (PAA) or a salt thereof, polyvinyl alcohol, and the like. The types and contents of the binders included in the layers constituting the negative electrode mixture layers 41 and 42 may be different from or identical to one another.

The negative electrode mixture layers 41 and 42 may have different thicknesses and are preferably formed so as to have substantially the same thickness. The thicknesses of the negative electrode mixture layers and 42 may be, for example, 30 to 80 μm and are preferably 40 to 60 μm. The layers constituting the negative electrode mixture layers 41 and 42 may have different thicknesses and may be formed so as to have substantially the same thickness. The negative electrode mixture layers 41 and 42 may further include a negative electrode active material other than the Si active material or the carbon active material. Examples of the other negative electrode active material include a metal other than Si which is capable of all with lithium, a compound containing such a metal, and lithium titanate.

In this embodiment, the negative electrode mixture layer 41 including the first layer 41A and the second layer 41B is formed on one of the surfaces of the negative electrode current collector 40 and the negative electrode mixture layer 42 including the third layer 42C and the fourth layer 42D is formed on the other surface. Accordingly, four types of negative electrode mixture slurries containing the Si active material at different proportions are used. For example, when the negative electrode mixture over 41 is formed, a first negative electrode mixture slurry for the first layer 41A is applied to the negative electrode current collector 40 and a second negative electrode mixture slurry for the second layer 41B is applied to the resulting coating film so as to cover the coating film. In this step, the coating film formed of the first negative electrode mixture slurry may be either dried or undried.

The separator 13 may be a porous sheet having ionic permeability and an insulating property. Specific examples of such a porous sheet include a microporous thin-film, a woven fabric, and a nonwoven fabric. Examples of a suitable material for the separator 13 include olefin resins, such as polyethylene and polypropylene; and celluloses. The separator 13 may have either a single-layer structure or a multilayer structure. The separator 13 may be provided with a heat-resistant layer or the like disposed on the surface thereof.

EXAMPLES

The present disclosure is further described with reference to Examples below. The present disclosure is not limited by Examples below.
Example 1
Preparation of Positive Electrode A lithium metal composite oxide represented by $LiNi_{0.85}Co_{0.09}Al_{0.03}O_2$, carbon black, and polyvinylidene fluoride were mixed with one another at a mass ratio of 100.0.8:0.7. An appropriate amount of N-methyl-2-pyrrolidone was added to the resulting mixture. Subsequently, the mixture was kneaded. Hereby, a positive electrode mixture slurry was prepared. The positive electrode mixture slurry was applied onto both surfaces of a positive electrode current collector composed of an aluminum foil having a thickness of 15 μm. After the resulting coating films had been dried, the coating films were rolled with a roller. Then, the electrode was cut into a predetermined size. Hereby, a positive electrode including a positive electrode current collector and positive electrode mixture layers disposed on the respective surfaces thereof was prepared.
Preparation of First Negative Electrode Mixture Slurry
(Slurry for First Layer)

A graphite powder was mixed with a Si-containing material represented by $SiO_x$ (x=1) having a carbon coating deposited thereon at a mass ratio of 86.5:13.5. Hereby, a negative electrode active material was prepared. The negative electrode active material, a sodium salt of CMC, and polyacrylic acid were mixed with one another at a mass ratio of 100:1:1. To the resulting mixture, pure water was added such that the solid content was 60% by mass. Then, kneading was performed for 30 minutes. Pure water was added to the kneaded mixture such that the solid content was 50% by mass. Subsequently, a dispersion of SBR was added to the mixture in an amount equal to 1% by mass of the amount of the negative electrode active material. Hereby, a first negative electrode mixture slurry was prepared.
Preparation of Second Negative Electrode Mixture Slurry
(Slurry for Second Layer)

A second negative electrode mixture slurry was prepared as in the preparation of the first negative electrode mixture slurry, except that the graphite powder was mixed with the Si-containing material at a mass ratio of 88.5:11.5.
Preparation of Third Negative Electrode Mixture Slurry
(Slurry for Third Layer)

A third negative electrode mixture slurry was prepared as in the preparation of the first negative electrode mixture slurry, except that the graphite powder was mixed with the Si-containing material at a mass ratio of 90.5:9.5.
Preparation of Fourth Negative Electrode Mixture Slurry
(Slurry for Fourth Layer)

A fourth negative electrode mixture slurry was prepared as in the preparation of the first negative electrode mixture slurry, except that the graphite powder was mixed with the Si-containing material at a mass ratio of 92.5:7.5.

Preparation of Negative Electrode

The second negative electrode mixture slurry was applied onto one of the surfaces of a negative electrode current collector composed of a copper foil having a thickness of 8 μm. The first negative electrode mixture slurry was applied to the resulting coating film so as to cover the coating film. Similarly, the third negative electrode mixture slurry was applied onto the other surface negative electrode mixture slurry was applied to the resulting coating film so as to cover the coating film. The amounts of the slurries used were the same as one another. After the coating films had been dried, the coating films were rolled with a roller. Then, the electrode was cut into a predetermined size. Hereby, a negative electrode including a first negative electrode mixture layer having a two-layer structure and a second negative electrode mixture layer having a two-layer structure was prepared. Specifically, the spirally wound electrode body described below was prepared such that the one of the surfaces of the current collector served as a first surface facing outward of the electrode body and the other surface served as a second surface facing inward of the electrode body. Table 1 summarizes the proportion of the amount of the Si-containing material to the total mass of the negative electrode active material in each of the layers constituting the negative electrode mixture layer. In Table 1, the values in the parentheses are the contents of the Si-containing material in terms of Si in the layers.

Preparation of Electrode Body

The positive electrode and the negative electrode were wound around a core having a radius of curvature of 1.5 mm with a separator interposed therebetween, the separator having a thickness of 20 μm and being composed of a polyethylene microporous membrane. A tape was attached onto the outermost peripheral surface. Hereby, a cylindrical, spirally wound electrode body was prepared. An aluminum positive electrode lead was welded to a portion of the positive electrode at which the current collector was exposed. A nickel negative electrode lead was welded to a portion of the negative electrode at which the current collector was exposed.

Preparation of Nonaqueous Electrolyte

Ethylene carbonate, dimethyl carbonate, and ethylmethyl carbonate were mixed with one another at a volume ratio of 20:60:20 to prepare a mixed solvent. Vinylene carbonate was dissolved in the mixed solvent at a concentration of 2% by mass. Subsequently, $LiPF_6$ was dissolved in the resulting solution at a concentration of 1.3 mol/liter. Hereby, a nonaqueous electrolyte was prepared.

Preparation of Battery

The electrode body was inserted into a closed-end cylindrical packaging can. The positive electrode lead was welded to a sealing material. The negative electrode lead was welded to the inner bottom of the packaging can. After the nonaqueous electrolyte had been charged into the packaging can, the opening of the packaging can was sealed secondary battery (height: 65 mm, diameter: 18 mm, design capacity: 3500 mAh) was prepared.

Evaluation of Cycle Characteristics (Capacity Retention Factor)

The battery was charged and discharged under the following conditions at 25°C. Then, the capacity retention factor of the battery was calculated. The evaluation results described in Table 1 are relative values with the capacity retention factor of the battery prepared in Comparative example 1 being 100.

Charge Discharge Conditions

Charge: The battery was charged at a constant current of 1050 mA until the battery voltage reached 4.2 V. The battery was further charged at a constant voltage of 4.2 V until the current reached 70 mA.

Discharge: The battery was discharged at a constant current at 1750 mA until the voltage reached 2.5 V.

The battery was subjected to 100 cycles of the above charge and discharge. The capacity retention factor of the battery was calculated using the formula below.

Capacity retention factor (%)=Discharge capacity in 100th cycle/Discharge capacity in first cycle× 100

Example 2

A negative electrode and a nonaqueous electrolyte secondary battery were prepared as in Example 1, except that the proportion of the amount of the Si-containing material to the total mass of the negative electrode active material in each of the layers was changed as described in Table 1. The battery was evaluated in terms of cycle characteristics as in Example 1

Comparative Example

A negative electrode and a nonaqueous electrolyte secondary battery were prepared as in Example 1, except that the layers constituting the first and second negative electrode mixture layers were formed using a negative electrode mixture slurry prepared by mixing graphite with the Si-containing material at a mass ratio of 89.5:10.5. The battery was evaluated in terns of cycle characteristics as in Example 1.

Comparative Example 2

A negative electrode and a nonaqueous electrolyte secondary battery were prepared as in Example 1, except that the proportion of the amount of the Si-containing material to the total mass of the negative electrode active material in each of the layers was changed as described in Table 1. The battery was evaluated in terms of cycle characteristics as in Example 1.

Comparative Example 3

A negative electrode and a nonaqueous electrolyte secondary battery were prepared as in Example 1, except that the proportion of the amount of the Si-containing material to the total mass of the negative electrode active material in each of the layers was changed as described in Table 1. The battery was evaluated in terms of cycle characteristics

TABLE 1

| | Content of Si-containing material (values in parentheses are contents in terms of Si) | | | | Capacity retention Factor |
|---|---|---|---|---|---|
| | First negative electrode mixture layer | | Second negative electrode mixture layer | | |
| | First layer | Second layer | Third layer | Fourth layer | (relative value) |
| Example 1 | 13.5 mass % (8.6 mass %) | 11.5 mass % (7.3 mass %) | 9.5 mass % (6.0 mass %) | 7.5 mass % (4.8 mass %) | 135 |
| Example 2 | 12 mass % (7.6 mass %) | 11 mass % (7 mass %) | 10 mass % (6.4 mass %) | 9 mass % (5.7 mass %) | 120 |
| Comparative example 1 | 10.5 mass % (6.7 mass %) | 10.5 mass % (6.7 mass %) | 10.5 mass % (6.7 mass %) | 10.5 mass % (6.7 mass %) | 100 |
| Comparative example 2 | 9 mass % (5.7 mass %) | 12 mass % (7.6 mass %) | 12 mass % (7.6 mass %) | 9 mass % (5.7 mass %) | 97 |
| Comparative example 3 | 12 mass % (7.6 mass %) | 9 mass % (5.7 mass %) | 9 mass % (5.7 mass %) | 12 mass % (7.6 mass %) | 75 |

As described in Table 1, the batteries prepared in Examples, where the content of the Si active material in terms of Si satisfied First layer>Second layer>Third layer>Fourth layer, had a high capacity retention factor and were excellent in terms of cycle characteristics compared with the batteries prepared in Comparative examples. It was confirmed that the cycle characteristics of the battery prepared in Example 2, where the differences in the content of the Si active material between the first and second layers, between the second and third layers, and between the third and fourth layers were 1%, was also markedly enhanced. It was also confirmed that the capacity retention factor was significantly reduced in the case where the content of the Si active material was increased in a direction toward the negative electrode current collector as in Comparative example 2 and in the case where the content of the Si active material was increased in a direction opposite to the direction toward the negative electrode current collector as in Comparative example 3.

Reference Signs List

10 NONAQUEOUS ELECTROLYTE SECONDARY BATTERY, 11 POSITIVE ELECTRODE, 12 NEGATIVE ELECTRODE, 13 SEPARATOR, 14 ELECTRODE BODY, 5 BATTERY CASING, 16 PACKAGING CAN, 17 SEALING MATERIAL, 18,19 INSULATING PLATE, 20 POSITIVE ELECTRODE TAB, 21 NEGATIVE ELECTRODE TAB, 22 GROOVED PORTION, 23 BOTTOM PLATE, 24 LOWER VALVE PLATE, 25 INSULATING MEMBER, 26 UPPER VALVE PLATE, 27 CAP, 28 GASKET, 30 POSITIVE ELECTRODE CURRENT COLLECTOR, 31 POSITIVE ELECTRODE MIXTURE LAYER, 40 NEGATIVE ELECTRODE CURRENT COLLECTOR, 40a. FIRST SURFACE, 40b SECOND SURFACE, 41,42 NEGATIVE ELECTRODE MIXTURE SAYER, 41A FIRST LAYER, 41B SECOND LAYER, 42C THIRD LAYER, 42D FOURTH LAYER

The invention claimed is:

1. A nonaqueous electrolyte secondary battery comprising a spirally wound electrode body in which a positive electrode and a negative electrode are spirally wound with a separator interposed therebetween,
wherein the negative electrode includes a negative electrode current collector, a first negative electrode mixture layer disposed on a first surface of the negative electrode current collector, and a second negative electrode mixture layer disposed on a second surface of the negative electrode current collector, the first surface and the second surface facing outward and inward of the electrode body, respectively,
wherein the first negative electrode mixture layer includes a Si active material composed of at least one of Si and a Si-containing material,
wherein a content of the Si active material in terms of Si is lower in a portion of the first negative electrode mixture layer which faces the negative electrode current collector in a thickness direction of the first negative electrode mixture layer, than in a portion of the first negative electrode mixture layer which faces a surface of the first negative electrode mixture layer in the thickness direction,
wherein the second negative electrode mixture layer includes the Si active material, and
wherein the content of the Si active material in terms of Si is lower in a portion of the second negative electrode mixture layer which faces a surface of the second negative electrode mixture layer in a thickness direction of the second negative electrode mixture layer, than in a portion of the second negative electrode mixture layer which faces the negative electrode current collector in the thickness direction.

2. The nonaqueous electrolyte secondary battery according to claim 1, wherein an average content of the Si active material in terms of Si in the second negative electrode mixture layer is lower than an average content of the Si active material in terms of Si in the first negative electrode mixture layer.

3. The nonaqueous electrolyte secondary battery according to claim 2, wherein the first negative electrode mixture layer includes a first layer arranged to face the surface of the first negative electrode mixture layer and a second layer arranged closer to the negative electrode current collector than the first layer, the second layer containing the Si active material at a lower proportion than the first layer in terms of Si, and
wherein the second negative electrode mixture layer includes a third layer arranged to face the negative electrode current collector and a fourth layer arranged to face the surface of the second negative electrode mixture layer, the fourth layer containing the Si active material at a lower proportion than the third layer in terms of Si.

4. The nonaqueous electrolyte secondary battery according to claim 2, wherein the content of the Si active material in the first negative electrode mixture layer is 5% to 25% by weight, and wherein the content of the Si active material in the second negative electrode mixture layer is less than 15% by weight.

5. The nonaqueous electrolyte secondary battery according to claim 1, wherein a minimum radius of curvature of the negative electrode is 1 to 5 mm.

6. The nonaqueous electrolyte secondary battery according to claim 1, wherein the first negative electrode mixture layer and the second negative electrode mixture layer include a carbon negative electrode active material.

* * * * *